United States Patent
Yoon et al.

(10) Patent No.: US 12,446,833 B2
(45) Date of Patent: Oct. 21, 2025

(54) METHOD FOR PREDICTING FAILURE OF BIO-INFORMATION ESTIMATION AND APPARATUS FOR ESTIMATING BIO-INFORMATION

(71) Applicant: SAMSUNG ELECTRONICS CO., LTD., Suwon-si (KR)

(72) Inventors: Seung Keun Yoon, Seoul (KR); Ui Kun Kwon, Hwaseong-si (KR); Dae Geun Jang, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1055 days.

(21) Appl. No.: 17/366,931

(22) Filed: Jul. 2, 2021

(65) Prior Publication Data

US 2022/0061770 A1    Mar. 3, 2022

(30) Foreign Application Priority Data

Aug. 26, 2020  (KR) .................. 10-2020-0107742
Feb. 1, 2021   (KR) .................. 10-2021-0013962

(51) Int. Cl.
*A61B 5/024*   (2006.01)
*A61B 5/00*    (2006.01)
(Continued)

(52) U.S. Cl.
CPC .......... *A61B 5/7221* (2013.01); *A61B 5/0205* (2013.01); *A61B 5/021* (2013.01);
(Continued)

(58) Field of Classification Search
None
See application file for complete search history.

(56) References Cited

U.S. PATENT DOCUMENTS 10,022,057 B1    7/2018  Blake et al.
2010/0152600 A1  6/2010  Droitcour et al.
(Continued)

FOREIGN PATENT DOCUMENTS

KR   10-2019-0043453 A    4/2019
KR   10-2019-0105421 A1   9/2019
(Continued)

OTHER PUBLICATIONS

"EMG (Electromyography)." Cleveland Clinic. Retrieved Mar. 28, 2025. https://my.clevelandclinic.org/health/diagnostics/4825-emg-electromyography (Year: 2025).*
(Continued)

*Primary Examiner* — Meredith Weare
(74) *Attorney, Agent, or Firm* — Sughrue Mion, PLLC

(57) ABSTRACT

A method for predicting failure of bio-information estimation is provided. The method for predicting failure of bio-information estimation includes: receiving a bio-signal; obtaining failure prediction indicators from the bio-signal that is received until a current time, the failure prediction indicators comprising at least one of a current number of pulses of the bio-signal until the current time, a current signal quality of the bio-signal until the current time, a maximum number of pulses of the bio-signal that are predicted to be measured until a time limit, and a maximum signal quality of the bio-signal that is predicted to be measured until the time limit; and predicting whether bio-information estimation will fail based on the failure prediction indicators before the time limit is elapsed.

26 Claims, 10 Drawing Sheets

(51) Int. Cl.
  *A61B 5/0205*  (2006.01)
  *A61B 5/021*  (2006.01)
  *A61B 5/0535*  (2021.01)
  *A61B 5/11*  (2006.01)
  *A61B 5/318*  (2021.01)
  *A61B 5/389*  (2021.01)

(52) U.S. Cl.
  CPC .......... *A61B 5/024* (2013.01); *A61B 5/02416* (2013.01); *A61B 5/0535* (2013.01); *A61B 5/1102* (2013.01); *A61B 5/318* (2021.01); *A61B 5/389* (2021.01)

(56) References Cited

U.S. PATENT DOCUMENTS

| | | |
|---|---|---|
| 2010/0240999 A1 | 9/2010 | Droitcour et al. |
| 2011/0172545 A1 | 7/2011 | Grudic et al. |
| 2016/0287110 A1* | 10/2016 | Morris ................ A61B 5/7221 |
| 2017/0042433 A1 | 2/2017 | Noh et al. |
| 2017/0095165 A1* | 4/2017 | Hirano ................ A61B 5/7221 |
| 2018/0092551 A1 | 4/2018 | Yuen et al. |
| 2018/0303434 A1 | 10/2018 | Selvaraj |
| 2019/0000394 A1 | 1/2019 | Chen et al. |
| 2019/0110757 A1 | 4/2019 | Kwon et al. |
| 2019/0142286 A1 | 5/2019 | Mouradian |
| 2019/0313980 A1 | 10/2019 | Yoon et al. |
| 2020/0077961 A1 | 3/2020 | Choi et al. |

FOREIGN PATENT DOCUMENTS

| | | |
|---|---|---|
| KR | 10-2019-0120684 A | 10/2019 |
| KR | 10-2020-0029741 A | 3/2020 |
| KR | 10-2145433 B1 | 8/2020 |
| WO | 2020/009387 A1 | 1/2020 |

OTHER PUBLICATIONS

Communication dated Jan. 21, 2022 issued by the European Patent Office in European Application No. 21191503.8.

Office Action dated Sep. 1, 2025, issued by Chinese Patent Office in Chinese Patent Application No. 202110755796.1.

* cited by examiner

METHOD FOR PREDICTING FAILURE OF BIO-INFORMATION ESTIMATION AND APPARATUS FOR ESTIMATING BIO-INFORMATION

CROSS-REFERENCE TO RELATED APPLICATION(S)

This application claims priority from Korean Patent Application No. 10-2020-0107742, filed on Aug. 26, 2020, and Korean Patent Application No. 10-2021-0013962, filed on Feb. 1, 2021 in the Korean Intellectual Property Office, the disclosures of which are incorporated by reference herein in their entireties.

BACKGROUND

1. Field

Apparatuses and methods consistent with example embodiments relate to predicting failure of bio-information estimation, and estimating bio-information when the bio-information estimation is predicted not to be failed.

2. Description of the Related Art

Recently, with the aging population, soaring medical costs, and a shortage of medical personnel for specialized medical services, research is being actively conducted on IT-medical convergence technologies, in which IT technology and medical technology are combined. Particularly, monitoring of the health condition of a human body is not limited to medical institutions, but is expanding to mobile healthcare fields that may monitor a user's health condition anywhere and anytime in daily life at home or office. Typical examples of bio-signals, which indicate the health condition of individuals, include an electrocardiogra (ECG) signal, a photoplethysmogram (PPG) signal, an electromyography (EMG) signal, and the like, and various bio-signal sensors have been developed to measure these signals in daily life. Particularly, a PPG sensor may estimate blood pressure of a human body by analyzing a shape of pulse waves which reflect cardiovascular status and the like.

Bio-signals, such as heart rate and the like, are generally measured within a short period of time, such that a brief movement or noise may significantly affect a measurement result. However, in order to measure a complex biological index or health index, such as blood pressure, it may be required to measure bio-signals for a longer period of time. In this case, a brief movement or noise may not greatly affect the bio-signals, since the bio-signals are measured for a relatively long period of time. However, a long measurement time also means that it is difficult to determine success or failure of the measurement. Accordingly, in measurements of such complex bio-signal or health index, there is a need to predict at an early stage whether estimation of bio-information will end up being failure.

SUMMARY

According to an aspect of an example embodiment, there is provided a method for predicting failure of bio-information estimation, the method including: receiving a bio-signal; obtaining failure prediction indicators from the bio-signal that is received until a current time, the failure prediction indicators including at least one of a current number of pulses of the bio-signal until the current time, a current signal quality of the bio-signal until the current time, a maximum number of pulses of the bio-signal that are predicted to be measured until a time limit, and a maximum signal quality of the bio-signal that is predicted to be measured until the time limit; and predicting whether bio-information estimation will fail based on the failure prediction indicators before the time limit is elapsed.

The bio-signal may include at least one of an electrocardiogramhy (ECG), a photoplethysmogram (PPG), a ballistocardiogram (BCG), an electromyography (EMG), an impedance plethysmogram (IPG), a pressure wave, and a video plethysmogram (VPG).

The obtaining the failure prediction indicators may include obtaining the current number of pulses by counting a number of pulses of the bio-signal that is input until the current time.

The obtaining the failure prediction indicators may include obtaining the current signal quality by calculating similarities between the pulses of the bio-signal that is input until the current time.

The obtaining the failure prediction indicators may include predicting a number of pulses during a remaining time period from the current time until the time limit is reached, and obtaining the maximum number of pulses based on the predicted number of pulses and the current number of pulses.

The obtaining the failure prediction indicators may include estimating a current heart rate based on the bio-signal that is input until the current time, and predicting a number of pulses during the remaining time period until the time limit is reached based on the estimated current heart rate.

The obtaining the failure prediction indicators may include predicting a number of pulses during a remaining time period from the current time until the time limit is reached, and obtaining the maximum signal quality based on a pre-defined similarity between the predicted number of pulses and a similarity between the pulses of the bio-signal that is input until the current time.

The predicting may include: comparing each of the obtained failure prediction indicators with a threshold value to obtain a comparison result; and based on the comparison result satisfying failure prediction criteria, outputting a failure flag.

A type of the failure prediction indicators, the threshold value, or the failure prediction criteria may be adjusted based on at least one of a type of the bio-signal, a type of bio-information, and a length of the time limit.

The predicting may include comparing the failure prediction indicators with the threshold value, starting from a prediction start point or a prediction start number of pulses.

The method may further include, in response to determination that the time limit has elapsed, outputting a failure flag.

The method may further include: estimating bio-information based on the bio-signal that is input until the current time; and in response to the bio-information estimation being successful, outputting a success flag.

The predicting may be performed in response to the success flag not being output in the estimating of the bio-information.

According to another aspect of an example embodiment, there is provided an apparatus for estimating bio-information, the apparatus including: a sensor configured to measure a bio-signal from an object; and a processor configured to: execute a bio-information estimation algorithm and a failure prediction algorithm for predicting a failure of bio-information estimation: predict the failure of the bio-information estimation based on the bio-signal that is input continuously from the sensor; and in response to the bio-information estimation being predicted to be failed within a first time limit, end the bio-information estimation, guide a re-measurement, or further measure the bio-signal until a second time limit is reached.

The failure prediction algorithm may obtain failure prediction indicators based on the bio-signal that is input until a current time; and based on the bio-information estimation algorithm not outputting a success flag until the current time, the failure prediction algorithm may predict the failure of the bio-information estimation based on the failure prediction indicators.

The failure prediction indicators may include at least one of a current number of pulses of the bio-signal until the current time, a current signal quality of the bio-signal until the current time, a maximum number of pulses of the bio-signal that are predicted to be measured until the first time limit, and a maximum signal quality of the bio-signal that is predicted to be measured until the first time limit.

The failure prediction algorithm may obtain the current number of pulses by counting a number of pulses of the bio-signal that is input until the current time.

The failure prediction algorithm may obtain the current signal quality by calculating similarities between the pulses of the bio-signal that is input until the current time.

The failure prediction algorithm may predict a number of pulses during a remaining time period from the current time until the first time limit is reached, and may obtain the maximum number of pulses based on the predicted number of pulses and the current number of pulses.

The failure prediction algorithm may estimate a current heart rate based on the bio-signal that is input until the current time, and may predict a number of pulses during the remaining time period from the current time until the first time limit is reached based on the estimated current heart rate.

The failure prediction algorithm may predict a number of pulses during the remaining time period from the current time until the first time limit is reached, and may obtain the maximum signal quality based on a pre-defined similarity between the predicted number of pulses and a similarity between the pulses of the bio-signal that is input until the current time.

The failure prediction algorithm may compare each of the obtained failure prediction indicators with a threshold value to obtain a comparison result; and based on the comparison result satisfying failure prediction criteria, may output a failure flag.

A type of the failure prediction indicators to be obtained, the threshold value, or the failure prediction criteria may be adjusted based on at least one of a type of the bio-signal, a type of the bio-information, and a length of the first time limit.

The failure prediction algorithm may compare at least some of the failure prediction indicators with the threshold value, starting from a prediction start point or a prediction start number of pulses.

In response to the failure flag being output, the processor may be further configured to output information on the failure of the bio-information estimation, guide information on the re-measurement, and information on an additional measurement until the second time limit is reached.

In response to the bio-information estimation not being predicted to be failed until the first time limit is reached, the failure prediction algorithm may output a failure flag.

The bio-information estimation algorithm may estimate the bio-information based on the bio-signal that is input until a current time, and in response to the bio-information estimation being successful, the bio-information estimation algorithm may output a success flag.

The bio-information may include at least one of blood pressure, vascular age, arterial stiffness, aortic pressure waveform, vascular compliance, stress index, and fatigue level.

According to another aspect of an example embodiment, there is provided an apparatus for estimating bio-information, the apparatus including: a sensor configured to measure a bio-signal from an object; and a processor configured to: count a current number of pulses of the bio-signal from a preset start time until a current time; while the sensor is continuously measuring the bio-signal, predict a maximum number of pulses of the bio-signal that is to be received until a preset end time is reached since the preset start time, based on the current number of pulses and a remaining time period from the current time to the preset end time: predict whether an estimation of the bio-information will fail, based on the predicted maximum number of pulses; and output a failure signal based on a prediction that the estimation of the bio-information will fail, to cause the sensor to stop measuring the bio-signal or start re-measuring the bio-signal.

DETAILED DESCRIPTION

Figure 1:
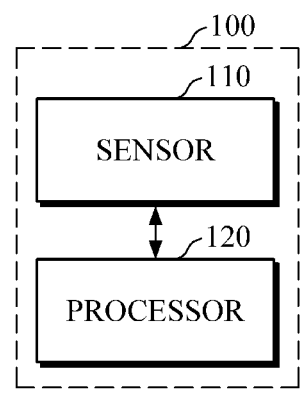
FIG. 1 is a block diagram illustrating an apparatus for estimating bio-information according to an example embodiment.

Details of other embodiments are included in the following detailed description and drawings. Advantages and features of the present invention, and a method of achieving the same will be more clearly understood from the following embodiments described in detail with reference to the accompanying drawings. Throughout the drawings and the detailed description, unless otherwise described, the same drawing reference numerals will be understood to refer to the same elements, features, and structures.

It will be understood that, although the terms first, second, etc. may be used herein to describe various elements, these elements should not be limited by these terms. These terms are only used to distinguish one element from another. Also, the singular forms are intended to include the plural forms as well, unless the context clearly indicates otherwise. It will be further understood that when an element is referred to as "comprising" another element, the element is intended not to exclude one or more other elements, but to further include one or more other elements, unless explicitly described to the contrary. In the following description, terms such as "unit" and "module" indicate a unit for processing at least one function or operation and they may be implemented by using hardware, software, or a combination thereof.

FIG. 1 is a block diagram illustrating an apparatus for estimating bio-information according to an example embodiment.

Referring to FIG. 1, the apparatus 100 for estimating bio-information includes a sensor 110 and a processor 120.

The sensor 110 may measure a bio-signal from an object. In particular, the bio-signal may be continuously measured over a predetermined period of time and may have repetitive pulse waveforms. Examples of the bio-signal may include an electrocardiogra (ECG) signal, a photoplethysmogram (PPG) signal, a ballistocardiogram (BCG) signal, an electromyography (EMG) signal, an impedance plethysmogram (IPG) signal, a pressure wave signal, a video plethysmogram (VPG) signal, and the like.

The sensor 110 may include, for example, a PPG sensor for measuring a PPG signal. The PPG sensor may include one or more light sources emitting light onto a user's object, and a detector detecting light which is transmitted to, and then reflected or scattered from the object. The light source may include a light emitting diode (LED), a laser diode (LD), a phosphor, and the like. The light source may be formed as a single light source or an array of two or more light sources. The respective light sources may emit light of different wavelengths. Further, the detector may include a photodiode, a phototransistor (PTr), a complementary metal-oxide semiconductor (CMOS) image sensor, a charge-coupled device (CCD) image sensor, etc., and may be formed as a single detector or an array of two or more detectors.

The processor 120 may be electrically connected to the sensor 110 directly or via a wireless communication. The processor 120 may control the sensor 110 to measure a bio-signal for estimating bio-information within a time limit (e.g., 60 seconds). The time limit may be set to various values by considering a type of bio-information to be estimated, computing performance of the apparatus 100 for estimating bio-information, a measurement position of a bio-signal, and the like. Further, the bio-signal measured by the sensor 110 may be input to the processor 120 continuously in real time during the measurement.

Upon receiving the bio-signal from the sensor 110, the processor 120 may remove noise, such as motion noise and the like, from the bio-signal by using various noise removal methods such as filtering, smoothing, and the like. For example, if the bio-signal is a PPG signal, the processor 120 may perform band-pass filtering with a cut-off frequency of 1 Hz to 10 Hz.

While the bio-signal is input from the sensor 110, the processor 120 may execute a failure prediction algorithm to continuously predict a probability of failure of bio-information estimation, such that even when bio-information is estimated continuously until a time limit is reached, the processor 120 may predict at an early stage whether there is a probability that the bio-information estimation is finally failed. The bio-information may include, for example, blood pressure, vascular age, arterial stiffness, aortic pressure waveform, vascular compliance, stress index, fatigue level, etc., but the examples of the bio-information are not limited thereto.

In particular, the failure prediction algorithm may be pre-generated by the processor 120 or an external device. In generating the failure prediction algorithm, sample valid bio-signals and sample invalid bio-signals are collected, wherein the sample valid bio-signals enable a successful bio-information estimation, and the sample invalid bio-signals cause a failure of the bio-information estimation. Performance of the failure prediction algorithm is evaluated based on any one or any combination of (1) sensitivity determined by comparing a case where bio-information estimation is predicted to be failed with a case where bio-information estimation is finally failed in practice, (2) singularity determined by comparing a case where bio-information estimation is predicted to be failed with a case where bio-information estimation is successfully performed in practice, and (3) a failure prediction time.

Hereinafter, various embodiments of predicting a probability of failure of bio-information estimation which is performed by the processor 120 will be described with reference to FIGS. 2 to 5.

Figure 2:
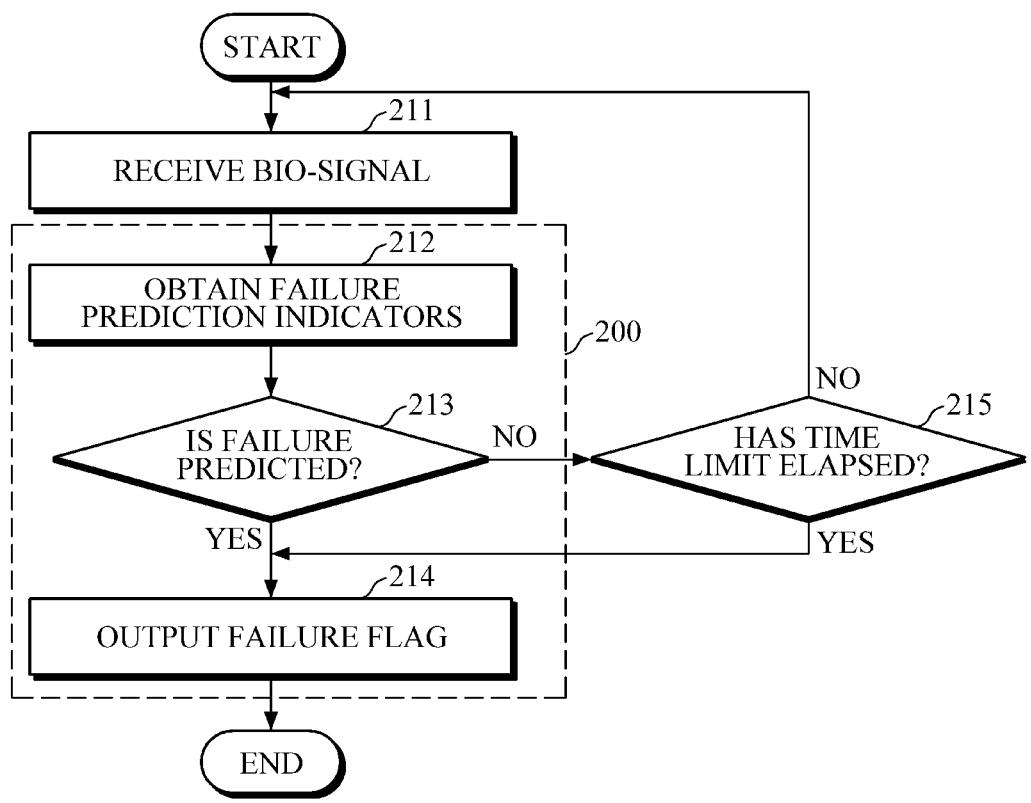
FIG. 2 is a flowchart illustrating a method for predicting failure of bio-information estimation according to an example embodiment.

FIG. 2 is a flowchart illustrating a method for predicting failure of bio-information estimation according to an example embodiment.

First, the processor 120 may receive a bio-signal from the sensor 110 in operation 211. The sensor 110 may measure the bio-signal continuously within a time limit, and after measurement of the bio-signal is complete, the measured bio-signal may be input to the processor 120 in real time.

Then, by using the failure prediction algorithm, the processor 120 may perform operation 200 of predicting in real time, whether estimation of bio-information will result in a failure, while continuously receiving the bio-signal. The prediction may be performed without waiting until the time limit for measuring the bio-signal is reached.

By using the failure prediction algorithm, the processor 120 may obtain failure prediction indicators based on the bio-signal received until the current time in operation 212. The failure prediction indicators may include a current number of pulses, a current signal quality, a maximum number of pulses, or a maximum signal quality, and the type of failure prediction indicators to be obtained may be predetermined according to various conditions such as a type of bio-signal, a type of bio-information, a length of the set time limit, and the like.

Figure 5:
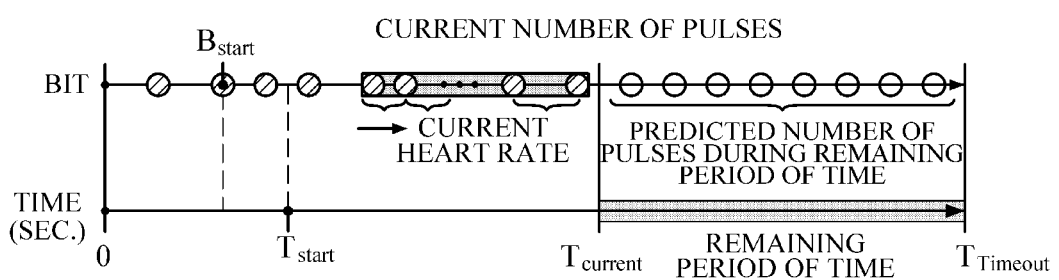
FIG. 5 is a diagram explaining failure prediction over time.

FIG. 5 is a diagram explaining failure prediction indicators obtained over time. Referring to FIG. 5, by counting a number of pulses over time using the bio-signal which is input continuously during a period between a measurement start time 0 and a current time $T_{current}$, a period between a preset prediction start time $T_{start}$ and the current time $T_{current}$, or a period between a prediction start number of pulses $B_{start}$ and the current time $T_{current}$, the failure prediction algorithm may obtain, as a current number of pulses, an accumulated number of pulses counted so far. The current number of pulses may be counted from the measurement start time 0. The starting point for determining whether the final estimation result will fail or succeed may be the preset prediction start time $T_{start}$ (if the time is used for the determination) or the prediction start number of pulses $B_{start}$ (if the number of pulses is used for the determination).

The preset prediction start time $T_{start}$ may or may not match the prediction start number of pulses $B_{start}$. For example, the preset prediction start time $T_{start}$ may be set to a preset time that is measured from the measurement start time 0, and the prediction start number of pulses $B_{start}$ may be set to an n-th pulse (e.g., the second pulse as shown in FIG. 5) that is counted from the measurement start time 0, wherein n denotes a natural number.

Further, the failure prediction algorithm may calculate a similarity between two pulses input until the current time $T_{current}$, and may determine a statistical value (e.g., mean value, median value, maximum value, etc.) of the calculated similarities to be a current signal quality. For example, the failure prediction algorithm may calculate similarities between temporally consecutive and adjacent pulses (e.g., first pulse-second pulse, second pulse-third pulse, etc.). Alternatively, the failure prediction algorithm may also calculate a similarity between any two of all the detected pulses, or a similarity between two pulses which are spaced apart by a predetermined interval (e.g., first pulse-third pulse, second pulse-fourth pulse, etc.). However, the similarity is not limited thereto.

The similarities between pulses may be represented by Euclidean distance, Pearson correlation coefficient, Spearman correlation coefficient, Cosine similarity, etc., but the embodiments of the disclosure are not limited thereto.

In addition, the failure prediction algorithm may predict a number of pulses available during a remaining time period $(T_{Timeout}-T_{current})$ between the current time $T_{current}$ and the time limit $T_{Timeout}$, and may obtain a maximum number of pulses based on the predicted number of pulses. For example, the failure prediction algorithm may obtain a current heart rate based on the bio-signal input until the current time: may obtain the predicted number of pulses by multiplying the obtained current heart rate by the remaining time until the time limit; and may obtain a value, obtained by summing up the obtained predicted number of pulses and the current number of pulses, as the maximum number of pulses during a period between the start time 0 and the time limit $T_{Timeout}$.

Further, the failure prediction algorithm may predict a number of pulses that are to be obtained during a remaining time period $(T_{Timeout}-T_{current})$ between the current time $T_{current}$ and the time limit $T_{Timeout}$, and may obtain a maximum number of pulses by using a similarity between the predicted number of pulses and a similarity between the pulses obtained until the current time. For example, by setting the similarities between the predicted number of pulses to a predetermined value, e.g., "1" and by setting the similarities between the pulses obtained until the current time to a statistical value such as a maximum value, a mean value, a median value, etc., the failure prediction algorithm may obtain a statistical value (e.g., mean value, median value, maximum value, etc.) of a total value, obtained by summing up all the set values and the similarities between the pulses obtained until the current time, as a maximum signal quality.

Then, the failure prediction algorithm may predict failure of bio-information estimation by using the obtained failure prediction indicators in operation 213. For example, by comparing the obtained failure prediction indicators with a threshold value set for the respective failure prediction indicators, and if a comparison result satisfies pre-defined failure prediction criteria, the failure prediction algorithm may predict that estimation of bio-information will be failed. The prediction may be completed prior to the time limit $T_{Timeout}$. The threshold value for the respective failure prediction indicators or the failure prediction criteria may be set and adjusted based on a type of bio-signal, a type of bio-information, a length of a time limit, and the like.

Further, starting from a preset prediction start time $T_{start}$ and/or a prediction start number of pulses $B_{start}$, the failure prediction algorithm may perform a process of obtaining the failure prediction indicators and/or a process of comparing the threshold value with the respective failure prediction indicators. The prediction start time $T_{start}$ or the prediction start number of pulses $B_{start}$ may be set differently for the respective failure prediction indicators. In addition, any one of or both of the prediction start time or prediction start number of pulses may be set for the respective failure prediction indicators.

For example, referring to FIG. 5, among the failure prediction indicators, the failure prediction algorithm may perform a process of comparing the current number of pulses, the current signal quality, the maximum number of pulses, and the maximum signal quality with the threshold value, starting from the preset prediction start time $T_{start}$. In another example, among the failure prediction indicators, the failure prediction algorithm may perform a process of comparing the current signal quality, the maximum number of pulses, and the maximum signal quality with the threshold value, starting from a time when the accumulated number of pulses is greater than or equal to the preset prediction start number of pulses $B_{start}$.

Subsequently, upon predicting the estimation of bio-information to be failed in operation 213, the failure prediction algorithm may output a failure flag in operation 214.

If the estimation of bio-information at the current time is not predicted to be failed in operation 213 based on the bio-signal obtained until the current time, the failure prediction algorithm may determine whether the current time exceeds the time limit in operation 215. Upon determination, if the estimation is not predicted to be failed until the current time and the time limit is not exceeded, the failure prediction algorithm may proceed to operation 211 to perform the process in 200 of predicting failure by using a bio-signal at a subsequent time. Upon determination, if the estimation is not predicted to be failed until the current time and the time limit is exceeded, the failure prediction algorithm may output the failure flag in operation 214 to indicate that the prediction is failed, and/or to indicate that estimation of the bio-information is failed.

The time limit may be equal to a time interval in which the sensor 110 measures the bio-signal, or may be set to be shorter than the time interval, and may be adjusted if necessary. By setting the time limit as described above, the failure prediction algorithm may predict at an early stage a probability of failure of bio-information estimation.

Figure 3:
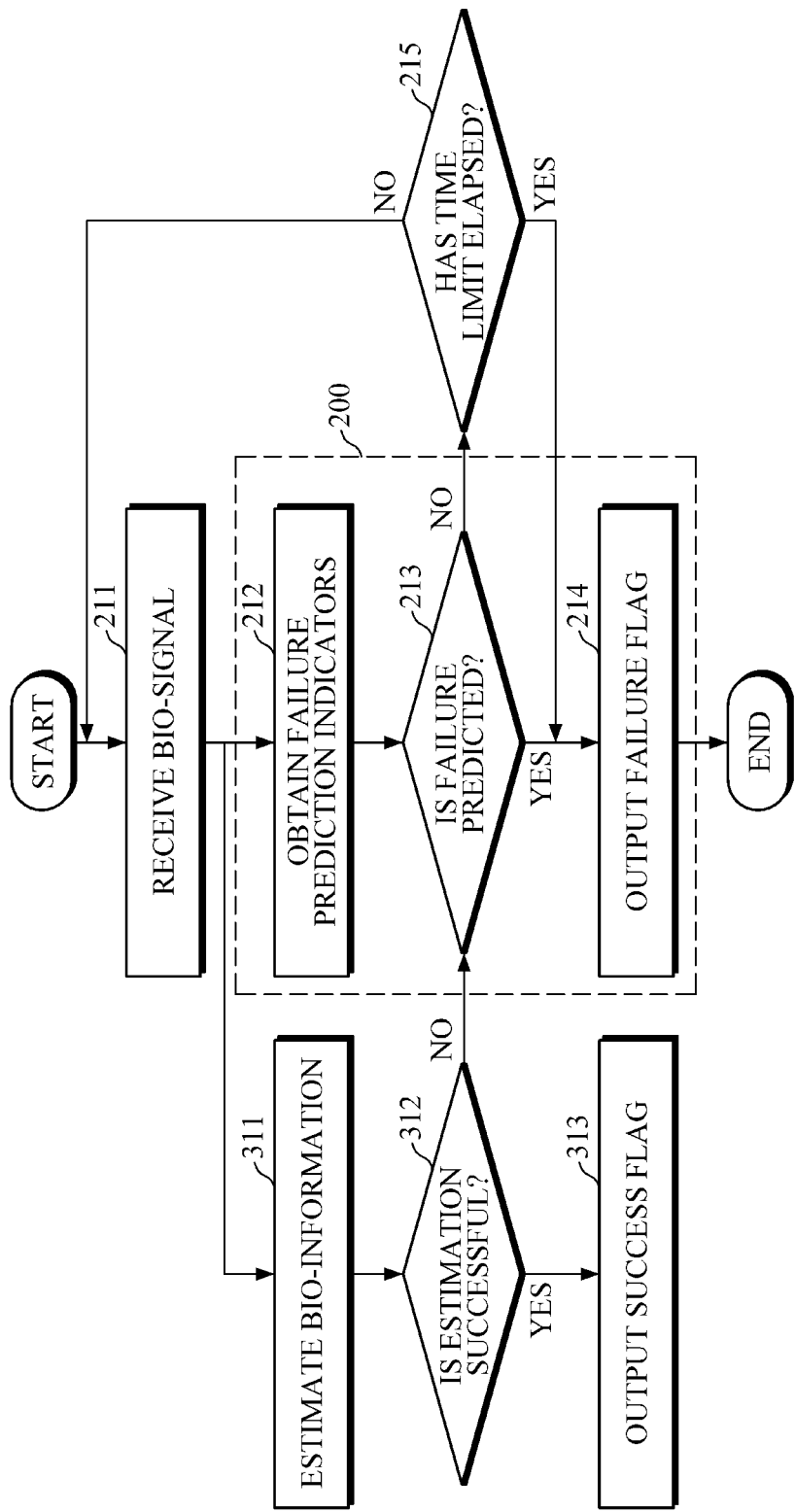
FIG. 3 is a flowchart illustrating a method for predicting failure of bio-information estimation according to another example embodiment.

FIG. 3 is a flowchart illustrating a method for predicting failure of bio-information estimation according to another example embodiment.

First, the processor 120 receives a bio-signal from the sensor 110 in operation 211.

Then, by executing a failure prediction algorithm while the bio-signal is continuously input, the processor 120 may perform the process in 200 of predicting failure of bio-information estimation. As described above with reference to FIG. 2, the failure prediction algorithm may obtain the failure prediction indicators by using the bio-signal obtained until the current time in operation 212, and may predict failure of bio-information estimation in operation 213 by using the obtained failure prediction indicators. Once the bio-information estimation is predicted to be failed based on the prediction in operation 213, the failure prediction algorithm may output a failure flag in operation 214, and once the bio-information estimation is not predicted to be failed, the failure prediction algorithm may determine whether the current time exceeds the time limit in operation 215. If the current time exceeds the time limit, the failure prediction algorithm may output the failure flag in operation 214 to indicate that the prediction is failed, and/or the estimation of the bio-information is failed.

Further, according to the example embodiment, the processor 120 may execute a bio-information estimation algorithm for estimating bio-information based on the bio-signal input until the current time while the bio-signal is input in operation 211. The bio-information estimation algorithm may be executed at the same time as, or prior to, the process in operation 200 of predicting failure using the failure prediction algorithm.

The bio-information estimation algorithm may estimate bio-information by using the bio-signal input until the current time in operation 311. In particular, the bio-information estimation algorithm may receive some required data (e.g., obtained pulses, etc.) from the failure prediction algorithm and may share the data. Alternatively, if the bio-information estimation algorithm performs a process of generating some data required for the failure prediction algorithm, the bio-information estimation algorithm may share the generated data with the failure prediction algorithm.

The bio-information estimation algorithm may extract features required for estimating bio-information by using the bio-signal input until the current time, a differential signal (e.g., first-order differential signal, second-order differential signal, etc.) of the bio-signal, etc., and may estimate bio-information by using the extracted features and a pre-defined bio-information estimation model. In particular, the features may include a maximum amplitude value of the bio-signal, an area of a waveform, time and/or amplitude values associated with propagating waves and reflected waves, or a combination thereof.

Upon succeeding in bio-information estimation by using the bio-signal input until the current time in operation 312, the bio-information estimation algorithm may output a success flag in operation 313. Once the success flag is output, the processor 120 may end the failure prediction algorithm, and may control the sensor 110 to stop measuring the bio-signal. In an another example, when the success flag is output, the processor 120 may stop executing the failure prediction algorithm, but may control the sensor 110 to continue to measure the bio-signal until the time limit, to obtain a final estimation result based on the bio-signal that is received until the time limit.

Upon determination in operation 312, if the estimation of bio-information is not successful until the current time, the failure prediction algorithm may determine in operation 213 whether failure prediction criteria are satisfied by using comparison results of the failure prediction indicators.

In addition, in the case where the bio-information estimation algorithm and the failure prediction algorithm are executed simultaneously, even when the bio-information estimation algorithm first outputs the success flag, if the failure prediction algorithm predicts that the estimation of bio-information will be failed based on the bio-signal at the current time, the failure prediction algorithm may finally output the failure flag. Even when the bio-information estimation algorithm succeeds in bio-information estimation by using the bio-signal input until the current time, noise such as motion noise and the like may be generated in the bio-signal, thereby resulting in a probability that a bio-information estimation result may not be relatively accurate. For this reason, the failure prediction algorithm may finally predict that the bio-information estimation will be failed, so as to allow a user to re-measure a bio-signal or to further measure a bio-signal continuously.

Figure 4:
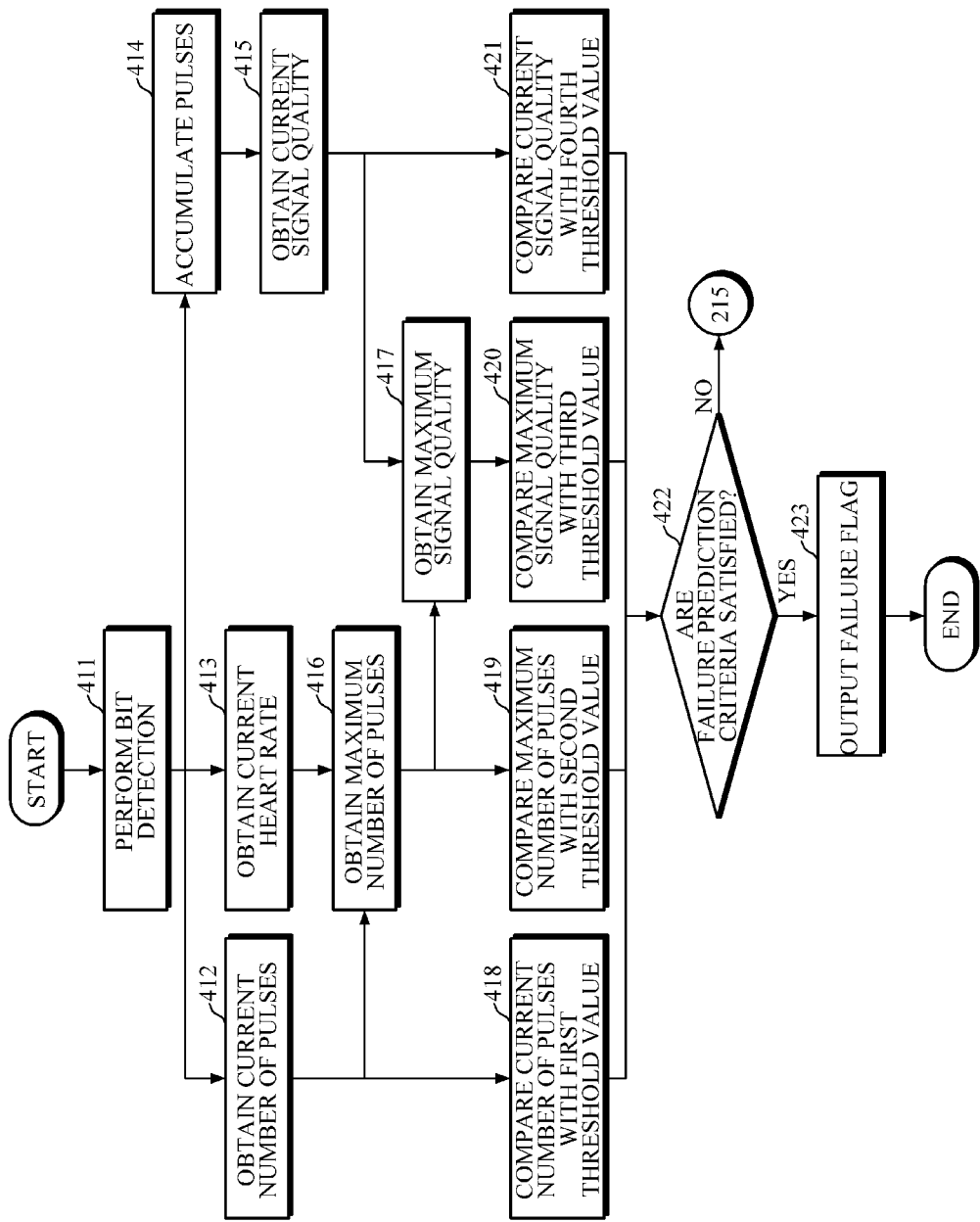
FIG. 4 is a flowchart illustrating a method for predicting failure of bio-information estimation according to yet another example embodiment.

FIG. 4 is a flowchart illustrating a method for predicting failure of bio-information estimation according to yet another example embodiment.

FIG. 4 illustrates the overall procedures of the process in operation 200 of predicting failure by the failure prediction algorithm described above with reference to FIGS. 2 and 3, and illustrates an example of obtaining a current number of pulses, a maximum number of pulses, a current signal quality, and a maximum signal quality as failure prediction indicators, and using all the obtained failure prediction indicators in failure prediction.

First, upon receiving a bio-signal at a current time from the sensor 110, the processor 120 may perform bit detection of the received bio-signal in operation 411, to obtain the current number of pulses in operation 412 and the current heart rate in operation 413.

Then, the processor 120 may accumulate the pulses by the bit detection in operation 414, and may obtain the current signal quality by using the accumulated pulses in operation 415. As described above, the processor 120 may calculate a similarity between the pulses accumulated so far, and may obtain a statistical value, e.g., mean value, of the calculated similarities as the current signal quality. In particular, the processor 120 may calculate similarities between temporally consecutive and adjacent pulses (e.g., first pulse-second pulse, second pulse-third pulse, etc.), or similarities between any two of all the detected pulses, or similarities between two pulses which are spaced apart by a predetermined interval.

Subsequently, the processor 120 may obtain the maximum number of pulses in operation 416 by using the current number of pulses, obtained in operation 412, and the current heart rate obtained in operation 413. For example, by using a remaining time period until the time limit is reached and the current heart rate, the processor 120 may predict a number of pulses which may be detected during the remaining time period, and by summing up the predicted number of pulses and the current number of pulses, the processor 120 may obtain the maximum number of pulses to be detected during the entire time limit.

Then, the processor 120 may obtain the maximum signal quality in operation 417 based on the number of pulses which is predicted in operation 416 and detected during the remaining time until the time limit, and based on the current signal quality obtained in operation 415. For example, by setting the similarity between the pulses predicted during the remaining time period until the time limit to any value, e.g., a maximum value of "1," and setting the similarity between the pulses obtained until the current time to a statistical value, such as a maximum value, a mean value, a median value, and the like, and by obtaining a mean value of similarities between all the pulses, the processor 120 may obtain the maximum signal quality.

Subsequently, the processor 120 may compare the obtained respective failure prediction indicators with a threshold value set for the respective failure prediction indicators in operations 418, 419, 420, and 421. The comparing the current number of pulses, the maximum number of pulses, the maximum signal quality, and the current signal quality in operations 418, 419, 420, and 421 may be performed starting from a pre-defined prediction start time, as shown in the following Table 1. Further, the comparing of the maximum number of pulses, the maximum signal quality, and the current signal quality in operations 419, 420, and 421 may be performed starting from the predicted number of pulses, as shown in the following Table 1. The following Table 1 merely shows an example of threshold values for the respective failure prediction indicators and a time of comparison, and conditions including the threshold values, the comparison time, and the like may be adjusted.

TABLE 1

| Failure prediction indicator | Threshold value | Prediction start time | Predicted number of pulses |
|---|---|---|---|
| Current number of pulses | B1 < 5 | 30 seconds | — |
| Current signal quality | Q1 < 0.52 | zero seconds | 7 bits |
| Maximum number of pulses | B2 < 20 | 30 seconds | 7 bits |
| Maximum signal quality | Q2 < 0.8 | 30 seconds | 7 bits |

In Table 1, B1 and B2 refer to a current number of pluses, and a maximum number of pulses that are predicted to be measured until the time limit, respectively. Q1 and Q2 refer to a current signal quality and a maximum signal quality that is predicted to be measured until the time limit, respectively.

The processor 120 may determine whether failure prediction criteria are satisfied in operation 422 based on comparison results of the respective failure prediction indicators. If the bio-information estimation algorithm is executed along with the failure prediction algorithm, the determining whether failure prediction criteria are satisfied in operation 422 may be performed when the success flag is not output by the bio-information estimation algorithm. However, the failure prediction algorithm is not limited thereto, and operation 422 may be performed regardless of whether the bio-information estimation algorithm outputs the success flag.

The failure prediction criteria may be preset and adjusted based on various conditions such as a bio-signal to be estimated, bio-information, a time limit, and the like. For example, if all the four failure prediction indicators are less than threshold values, if two or more failure prediction indicators are less than threshold values, or if a specific failure prediction indicator, designated for each of specific circumstances, is less than a threshold value, estimation may be predicted to be failed.

Then, if the failure prediction criteria are satisfied in operation 422, the processor 120 may output the failure flag in operation 423; and if the failure prediction criteria are not satisfied in operation 422, the processor 120 may proceed to operation 215 of determining whether the time limit has elapsed, as described above with reference to FIGS. 2 and 3.

Referring back to FIG. 1, the processor 120 may estimate bio-information (e.g., blood pressure) based on the bio-signal.

For example, as described above in FIG. 3, the processor 120 may execute the bio-information estimation algorithm and the failure prediction algorithm, and may perform bio-information estimation and failure prediction at the same time by using the bio-signal received so far.

Once the bio-information estimation success flag is output by the bio-information estimation algorithm, the processor 120 may end the failure prediction algorithm, may control the sensor 110 to stop measuring the bio-signal, and may provide a bio-information estimation result to a user through an output device included in the apparatus 100 for estimating bio-information or a connected external output device.

If the bio-information estimation failure flag is output by the failure prediction algorithm within the time limit, the processor 120 may end the execution of the bio-information estimation algorithm and/or may control the sensor 110 to stop measuring the bio-signal, and may provide guide information on failure of the bio-information estimation and/or remeasurement through the connected external output device.

Alternatively, if bio-information estimation is not predicted to be failed based on the failure prediction indicators within a first time limit, and the failure flag is output after lapse of the time limit, the processor 120 may provide a user with guide information on failure of the bio-information estimation and/or remeasurement through the external device included in the apparatus 100 for estimating bio-information or the connected external device, or may further measure a bio-signal during a predetermined second time limit, or may further perform bio-information estimation and/or failure estimation.

In another example, as described above with reference to FIG. 2, the processor 120 may first perform a failure prediction process by executing the failure prediction algorithm based on the bio-signal received so far, and if the failure flag is output after lapse of the time limit, the processor 120 may also execute the bio-information estimation algorithm based on the bio-signal input until the time limit is reached. If the estimation of bio-information is failed, the processor 120 may provide a user with guide information on failure of the bio-information estimation and/or remeasurement, or may further measure a bio-signal during a predetermined second time limit, or may further perform bio-information estimation and/or failure estimation.

Figure 6:
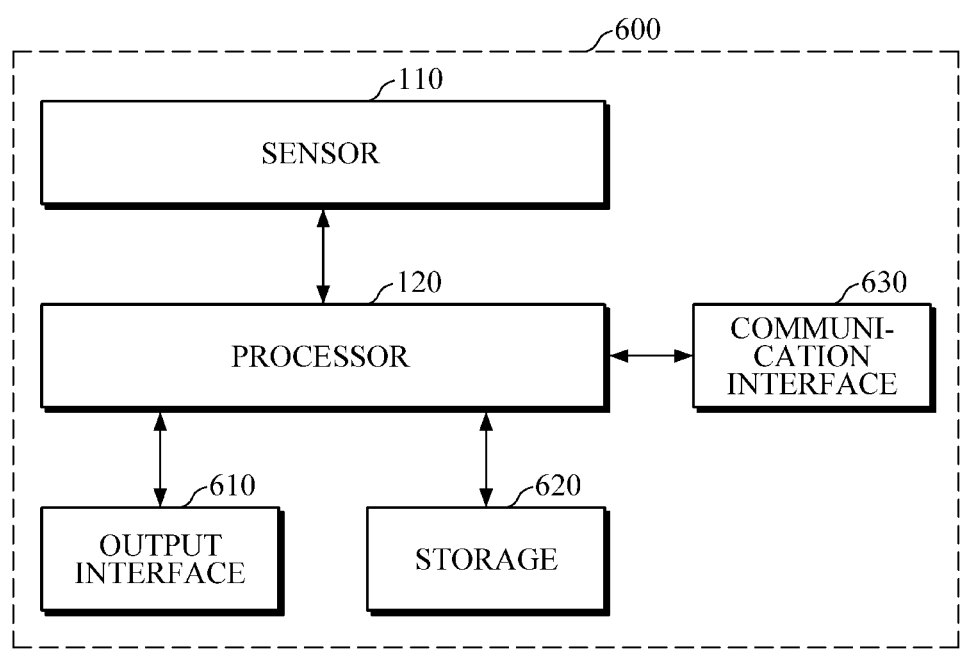
FIG. 6 is a block diagram illustrating an apparatus for estimating bio-information according to another example embodiment.

FIG. 6 is a block diagram illustrating an apparatus for estimating bio-information according to another example embodiment.

Referring to FIG. 6, the apparatus 600 for estimating bio-information includes the sensor 110, the processor 120, an output interface 610, a storage 620, and a communication interface 630. The sensor 110 and the processor 120 are described above in detail, such that a description thereof will be omitted.

The output interface 610 may provide a user with results processed by the processor 120 by various visual/non-visual methods using a display, a sound output device, a haptic device, and the like. For example, the output interface 610 may provide a user information on failure of bio-information estimation, guide information on remeasurement, and/or progress in further measurement, and the like.

The storage 620 may store a variety of information required for estimating bio-information and/or for predicting failure. For example, the storage 620 may store failure prediction indicators to be obtained, threshold values for the respective failure prediction indicators, failure prediction criteria, prediction start time, prediction start number of pulses, time limit, bio-information estimation model, user characteristic information such as a user's age, gender, health condition, and the like.

The storage 620 may include at least one storage medium of a flash memory type memory, a hard disk type memory, a multimedia card micro type memory, a card type memory (e.g., an SD memory, an XD memory, etc.), a Random Access Memory (RAM), a Static Random Access Memory (SRAM), a Read Only Memory (ROM), an Electrically Erasable Programmable Read Only Memory (EEPROM), a Programmable Read Only Memory (PROM), a magnetic memory, a magnetic disk, and an optical disk, and the like, but is not limited thereto.

The communication interface 630 may communicate with an external device by using various communication techniques, to transmit and receive data required for estimating bio-information and/or predicting failure, and data generated and processed by the sensor 110 or the processor 120 with the external device. The external device may include various information processing devices, such as a smartphone, a tablet PC, a desktop computer, a laptop computer, and the like.

Examples of the communication techniques may include Bluetooth communication, Bluetooth Low Energy (BLE) communication, Near Field Communication (NFC), WLAN communication, Zigbee communication, Infrared Data Association (IrDA) communication, Wi-Fi Direct (WFD) communication, Ultra-Wideband (UWB) communication, Ant+ communication, WIFI communication, and 3G, 4G, and 5G communications, but are not limited thereto.

Figure 7:
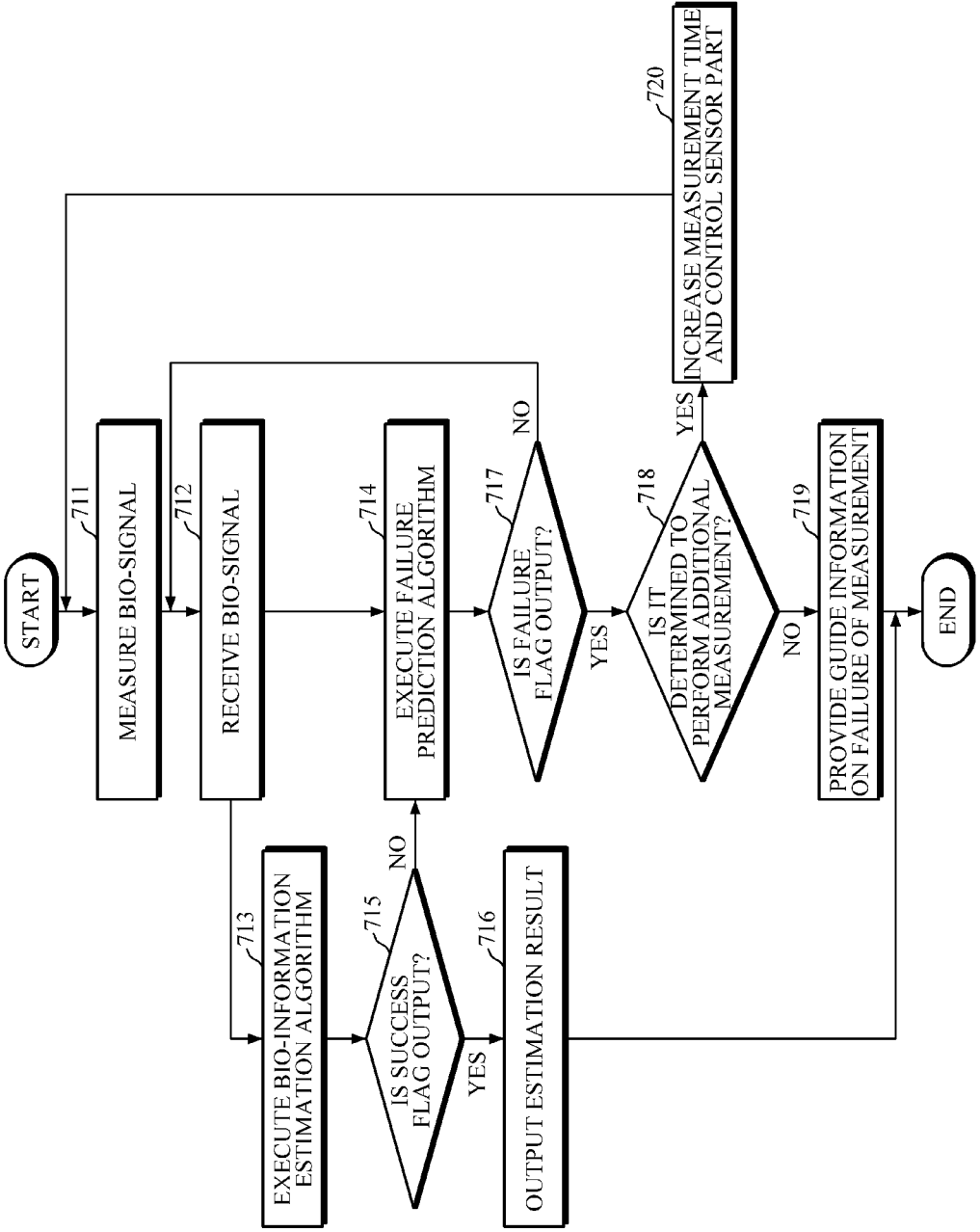
FIG. 7 is a flowchart illustrating a method of estimating bio-information according to an example embodiment.

FIG. 7 is a flowchart illustrating a method of estimating bio-information according to an example embodiment.

FIG. 7 is an example of a method of estimating bio-information which is performed by the aforementioned apparatuses 100 and 600 for estimating bio-information.

First, the sensor 110 continuously measures a bio-signal from an object for a predetermined period of time in operation 711.

Then, the processor 120 may receive the bio-signal measured by the sensor 110 until the current time in operation 712.

Subsequently, upon receiving the bio-signal measured until the current time from the sensor 110 in operation 712, the processor 120 executes the bio-information estimation algorithm and the failure prediction algorithm in operations 713 and operation 714 to perform bio-information estimation and failure prediction at the same time based on the bio-signal received until the current time.

Next, if the bio-information estimation is succeeded in operation 713 such that a success flag is output, the processor 120 may output a bio-information estimation result in operation 716, and ends the measurement of bio-signal, execution of the failure prediction algorithm, and the like.

If the bio-information estimation success flag is not output in operation 715, and the estimation is predicted to be failed by the failure prediction algorithm before a time limit elapses or a failure flag is output after lapse of the time limit in operation 717, the processor 120 may determine whether to perform additional measurement. In this case, it is predetermined whether to perform additional measurement. For example, if the estimation is predicted to be failed before the time limit elapses, it may be set to end the estimation of bio-information without additional measurement, or if the estimation is not predicted to be failed within the time limit such that the failure flag is output after lapse of the time limit, it may be set to further perform measurement of a bio-signal, estimation of bio-information, and prediction of failure during an additional period of time.

Then, upon determining to perform additional measurement in operation 718, the processor 120 may increase a measurement time and may control the sensor 110 in operation 720 to proceed to the measuring of the bio-signal in operation 711; and if not, the processor 120 may end the bio-signal measurement and the bio-information estimation algorithm and the failure prediction algorithm, and may output guide information indicating that the measurement of bio-information is failed or guide information on remeasurement in operation 719.

Upon determination in operation 717, if the estimation is not predicted to be failed at the current time, and the time limit has not elapsed such that the failure flag is not output, the processor 120 may proceed to operation 712 of receiving a bio-signal for estimating bio-information in operation 713 and predicting failure in operation 714 by using a bio-signal at a subsequent time.

Figure 8:
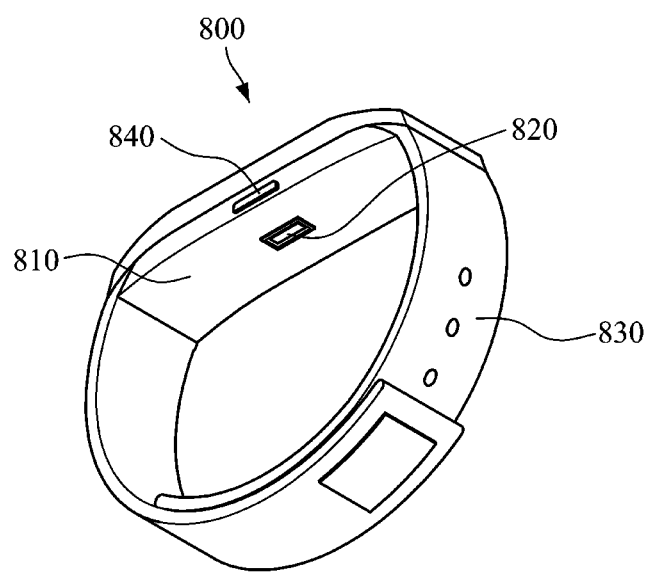
FIGS. 8 to 10 are diagrams illustrating various examples of an electronic device including an apparatus for estimating bio-information.
Figure 9:
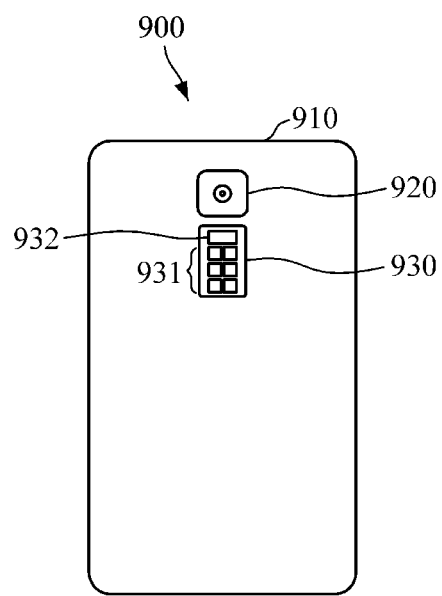
Figure 10:
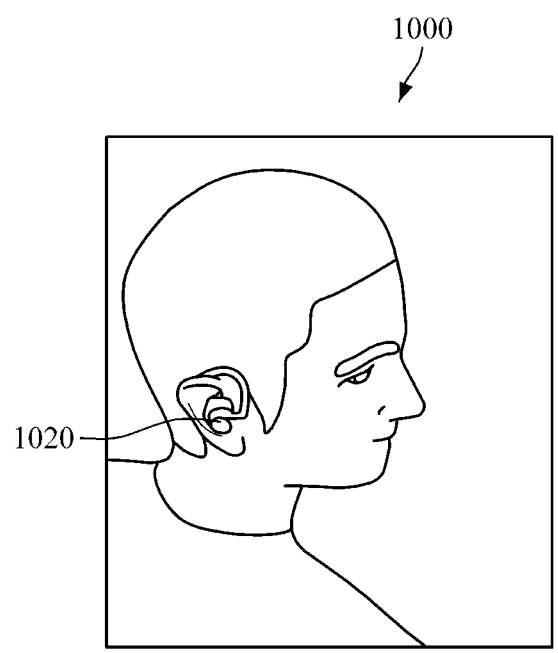

FIGS. 8 to 10 are diagrams illustrating various examples of an electronic device including an apparatus for estimating bio-information.

The electronic device including the aforementioned apparatuses 100 and 600 for estimating bio-information may include a smart watch-type wearable device 800, a mobile device 900 such as a smartphone, and an ear wearable device 1000 as illustrated in FIGS. 8 to 10. However, the electronic device is not limited thereto, and may include a smart band, smart glasses, a smart ring, a smart patch, a smart necklace, a tablet PC, and the like. The electronic device includes the apparatuses 100 and 600 for estimating bio-information, and components of the apparatuses 100 and 600 for estimating bio-information may be mounted in a single electronic device, or may be mounted in two or more electronic devices.

Referring to FIG. 8, the smart watch-type wearable device 800 includes a main body 810 and a strap 830.

The strap 830, which is connected to both ends of the main body 810, may be flexible so as to be wrapped around a user's wrist. The strap 830 may include a first strap and a second strap which are separated from each other. One ends of the first strap and the second strap are connected to the main body 810, and the other ends thereof may be connected to each other via a connector. The connector may be implemented to provide magnetic connection, Velcro connection, pin connection, and the like, but the connection type is not limited thereto. Air may be injected into the strap 830, or the strap 830 may be provided with an air bladder to have elasticity according to a change in pressure applied to the wrist, and may transmit the change in pressure of the wrist to the main body 810. A battery may be embedded in the main body 810 or the strap 830 to supply power to the wearable device 800.

A sensor 820 of the apparatuses 100 and 600 for estimating bio-information may be mounted on a rear surface of the main body 810, and may include a light source and a detector. A processor of the apparatuses 100 and 600 for estimating bio-information may be mounted in the main body 810, may be connected to various components such as the sensor 820 and the like to control the components, and may perform the aforementioned functions of estimating bio-information, predicting failure of estimation, and/or various functions performed by other electronic devices.

Further, the main body 810 may include a storage which stores a variety of information required for estimating bio-information and/or for predicting failure, as well as other information processed by the components. In addition, the main body 810 may include a manipulator 840 which is provided on one side surface of the main body 810, and receives a user's control command and transmits the received control command to the processor. The manipulator 840 may have a power button to input a command to turn on/off the wearable device 800.

In addition, a display for outputting information to a user may be mounted on a front surface of the main body 810. The display may have a touch screen for receiving touch input. The display may receive a user's touch input and transmit the touch input to the processor, and may display processing results of the processor.

Moreover, the main body 810 may include a communication interface for communication with an external device. The communication interface may transmit and receive data with the external device.

Referring to FIG. 9, the smartphone type mobile device 900 may include a main body 910 and a display panel. The main body 910 may form an exterior of the mobile device 900. The main body 910 has a first surface, on which a display panel and a cover glass may be disposed sequentially, and the display panel may be exposed to the outside through the cover glass. The main body 910 has a second surface, on which a sensor 930 is provided. The sensor 930 may include one or more light sources 931 and a detector 932. Further, a camera module 920 and/or an infrared sensor, etc. may be disposed on the second surface of the main body 910. The processor and other components, such as the communication interface, the storage, etc., of the apparatuses 100 and 600 for estimating bio-information may be disposed in the main body 910, and may estimate bio-information and/or predict failure, as well as store processing results and communicate with the external device.

Referring to FIG. 10, the ear wearable device 1000 may include a main body and an ear strap A user may wear the wearable device by hanging the ear strap on a user's auricle. The ear strap may be omitted according to a shape of the ear wearable device 1000. The main body may be inserted into the external auditory meatus. A sensor 1020 may be mounted in the main body. The ear wearable device 1000 may provide a bio-information estimation result and/or failure prediction result as sounds to a user, or may transmit the results to an external device, e.g., a mobile device, a tablet PC, a personal computer, etc., through a communication module mounted in the main body.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method for predicting failure of bio-information estimation, the method comprising:
measuring, by a sensor and from a start time, a bio-signal comprising pulses corresponding to a heart rate;
continuously inputting, to a processor, the bio-signal in real time;
executing, by the processor, a bio-information estimation algorithm for estimating bio-information based on the input bio-signal; and
executing, by the processor, a failure prediction algorithm for predicting a failure of bio-information estimation until the failure prediction algorithm predicts bio-information estimation will fail or a current time reaches a preset time limit after the start time, the failure prediction algorithm comprising:
obtaining failure prediction indicators from the bio-signal input until the current time, the failure prediction indicators comprising at least one of a current number of pulses of the bio-signal until the current time, a current signal quality of the bio-signal until the current time, a maximum number of pulses of the bio-signal that are predicted to be measured until the preset time limit, and a maximum signal quality of the bio-signal that is predicted to be measured until the preset time limit, wherein the obtaining the failure prediction indicators comprises predicting a number of pulses during a remaining time period from the current time until the preset time limit, and obtaining the maximum number of pulses based on the predicted number of pulses and the current number of pulses; and
predicting whether the bio-information estimation will fail based on the failure prediction indicators; and
in response to the bio-information estimation being predicted to fail, ending, by the processor, the bio-information estimation.

2. The method of claim 1, wherein the bio-signal comprises at least one of an electrocardiography (ECG), a photoplethysmogram (PPG), a ballistocardiogram (BCG), an impedance plethysmogram (IPG), a pressure wave, and a video plethysmogram (VPG).

3. The method of claim 1, wherein the obtaining the failure prediction indicators comprises obtaining the current number of pulses by counting a number of pulses of the bio-signal that is input until the current time.

4. The method of claim 1, wherein the obtaining the failure prediction indicators comprises obtaining the current signal quality by calculating similarities between the pulses of the bio-signal that is input until the current time.

5. The method of claim 1, wherein the obtaining the failure prediction indicators comprises estimating a current heart rate based on the bio-signal that is input until the current time, and predicting a number of pulses during the remaining time period until the preset time limit is reached based on the estimated current heart rate.

6. The method of claim 1, wherein the obtaining the failure prediction indicators comprises predicting a number of pulses during the remaining time period from the current time until the time is reached, and obtaining the maximum signal quality based on a pre-defined similarity between the predicted number of pulses and a similarity between the pulses of the bio-signal that is input until the current time.

7. The method of claim 1, wherein the predicting comprises:
comparing each of the obtained failure prediction indicators with a threshold value to obtain a comparison result; and
based on the comparison result satisfying failure prediction criteria, outputting a failure flag.

8. The method of claim 7, wherein a type of the failure prediction indicators, the threshold value, or the failure prediction criteria are adjusted based on at least one of a type of the bio-signal, a type of bio-information, and a length of the preset time limit.

9. The method of claim 7, wherein the predicting comprises comparing the failure prediction indicators with the threshold value, starting from a prediction start point or a prediction start number of pulses.

10. The method of claim 1, further comprising, in response to the bio-information estimation not being predicted to fail, determining, by the processor, whether the current time has exceeded the preset time limit; and outputting, by the processor, a failure flag based on determining that the current time has exceeded the preset time limit.

11. The method of claim 1, further comprising:
estimating, by the processor, bio-information based on the bio-signal that is input until the current time; and
in response to the bio-information estimation not failing, outputting a success flag.

12. The method of claim 11, wherein the predicting is performed in response to the estimating of the bio-information failing.

13. An apparatus for estimating bio-information, the apparatus comprising:
a sensor configured to measure a bio-signal from an object from a start time, the bio-signal comprising pulses corresponding to a heart rate; and
a processor configured to:
continuously receive the bio-signal from the sensor in real time;
execute a bio-information estimation algorithm for estimating bio-information based on the input bio-signal;
execute a failure prediction algorithm for predicting failure of bio-information estimation based on the received bio-signal, wherein the failure prediction algorithm is executed until the failure prediction algorithm predicts bio-information estimation will fail or a current time exceeds a first time limit after the start time; and
in response to the bio-information estimation being predicted to fail within the first time limit, end the bio-information estimation, guide a re-measurement, or further measure the bio-signal until a second time limit is reached,
wherein the failure prediction algorithm obtains failure prediction indicators based on the bio-signal that is input until the current time,
wherein the failure prediction indicators comprise at least one of a current number of pulses of the bio-signal until the current time, a current signal quality of the bio-signal until the current time, a maximum number of pulses of the bio-signal that are predicted to be measured until the first time limit, and a maximum signal quality of the bio-signal that is predicted to be measured until the first time limit, and
wherein the failure prediction algorithm predicts a number of pulses during a remaining time period from the current time until the first time limit is reached, and obtains the maximum number of pulses based on the predicted number of pulses and the current number of pulses.

14. The apparatus of claim 13, wherein the failure prediction algorithm
is first executed in response to the bio-information estimation algorithm not outputting a success flag before the current time.

15. The apparatus of claim 14, wherein the failure prediction algorithm obtains the current number of pulses by counting a number of pulses of the bio-signal that is input until the current time.

16. The apparatus of claim 14, wherein the failure prediction algorithm obtains the current signal quality by calculating similarities between the pulses of the bio-signal that is input until the current time.

17. The apparatus of claim 14, wherein the failure prediction algorithm estimates a current heart rate based on the bio-signal that is input until the current time, and predicts a number of pulses during the remaining time period from the current time until the first time limit is reached based on the estimated current heart rate.

18. The apparatus of claim 14, wherein the failure prediction algorithm predicts a number of pulses during the remaining time period from the current time until the first time limit is reached, and obtains the maximum signal quality based on a pre-defined similarity between the predicted number of pulses and a similarity between the pulses of the bio-signal that is input until the current time.

19. The apparatus of claim 14, wherein the failure prediction algorithm:
compares each of the obtained failure prediction indicators with a threshold value to obtain a comparison result; and
based on the comparison result satisfying failure prediction criteria, outputs a failure flag.

20. The apparatus of claim 19, wherein a type of the failure prediction indicators to be obtained, the threshold value, or the failure prediction criteria are adjusted based on at least one of a type of the bio-signal, a type of the bio-information, and a length of the first time limit.

21. The apparatus of claim 19, wherein the failure prediction algorithm compares at least some of the failure prediction indicators with the threshold value, starting from a prediction start point or a prediction start number of pulses.

22. The apparatus of claim 19, wherein in response to the failure flag being output, the processor is further configured to output information on the failure of the bio-information estimation, guide information on the re-measurement, and information on an additional measurement until the second time limit is reached.

23. The apparatus of claim 14, wherein, in response to the bio-information estimation not being predicted to fail and a determination that the current time exceeds the first time limit, the failure prediction algorithm outputs a failure flag.

24. The apparatus of claim 13, wherein the bio-information estimation algorithm estimates the bio-information based on the bio-signal that is input until the current time, and in response to the bio-information estimation not failing, the bio-information estimation algorithm outputs a success flag.

25. The apparatus of claim 24, wherein the bio-information comprises blood pressure.

26. An apparatus for estimating bio-information, the apparatus comprising:

a sensor configured to measure a bio-signal from an object, the bio-signal comprising pulses corresponding to a heart rate; and a processor configured to:
  receive the bio-signal from the sensor;
  count a current number of pulses of the bio-signal from a preset start time until a current time;
  predict a maximum number of pulses of the bio-signal that is to be received up to a preset end time after the preset start time, based on the current number of pulses and a remaining time period from the current time to the preset end time;
  predict whether an estimation of the bio-information will fail, based on the predicted maximum number of pulses; and
  output a failure signal based on a prediction that the estimation of the bio-information will fail, to cause the sensor to stop measuring the bio-signal or start re-measuring the bio-signal.

* * * * *